Jan. 20, 1953  E. S. THOMPSON  2,626,159
STRAW CHOPPER AND SPREADER FOR HARVESTERS
Filed April 1, 1949  3 Sheets-Sheet 1
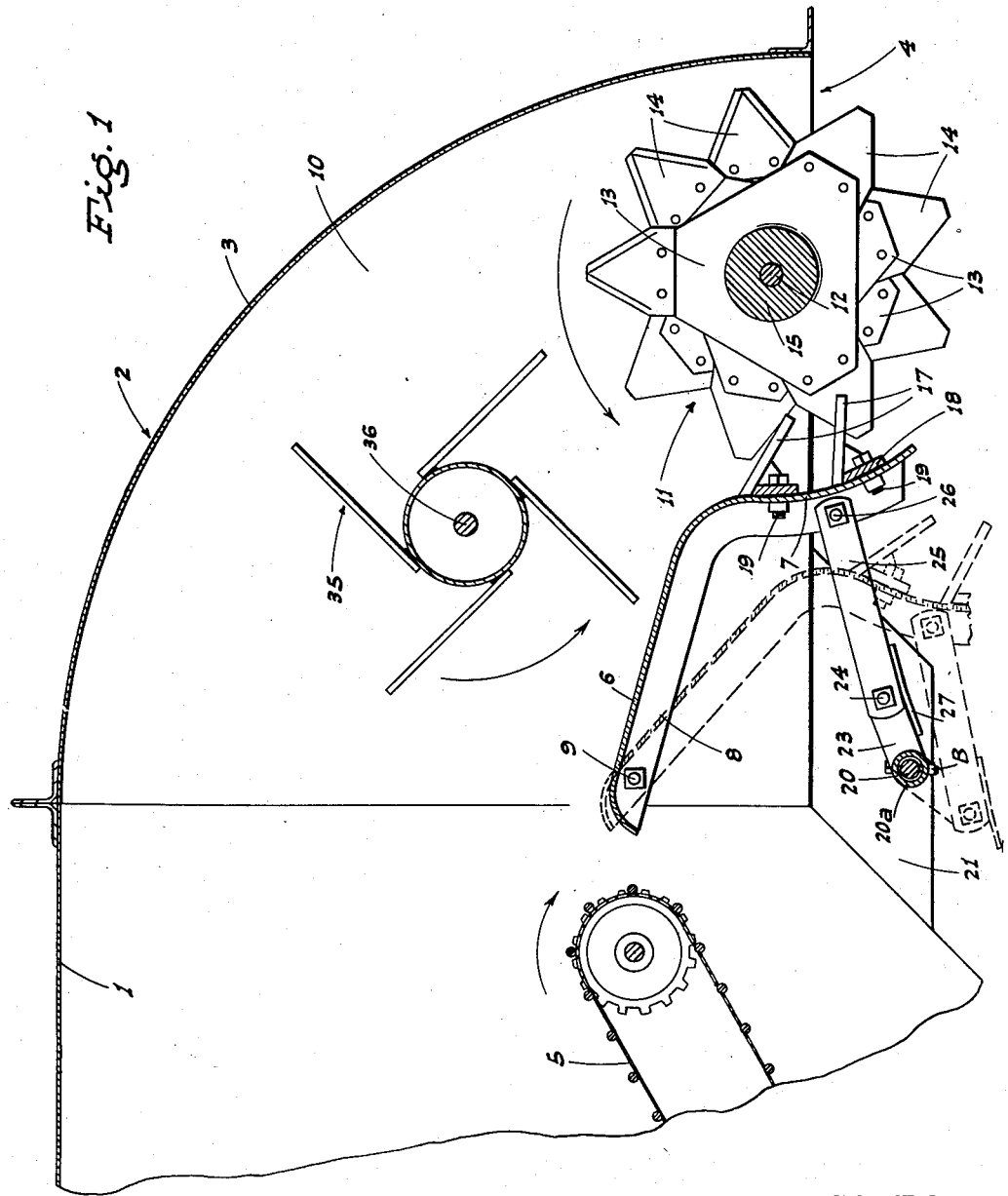
INVENTOR.
E. S. Thompson
BY
ATTYS

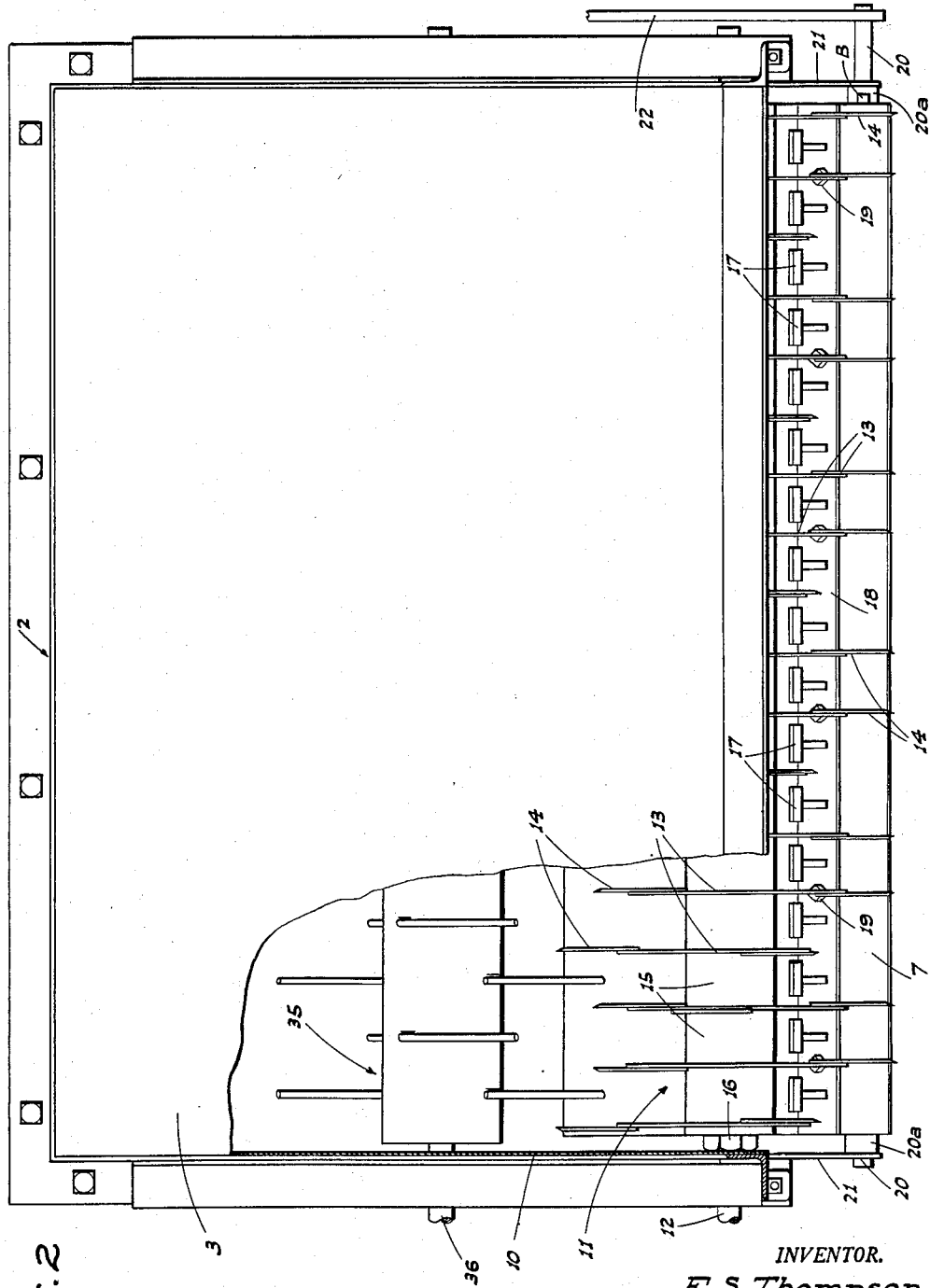

Jan. 20, 1953 E. S. THOMPSON 2,626,159
STRAW CHOPPER AND SPREADER FOR HARVESTERS
Filed April 1, 1949 3 Sheets-Sheet 3
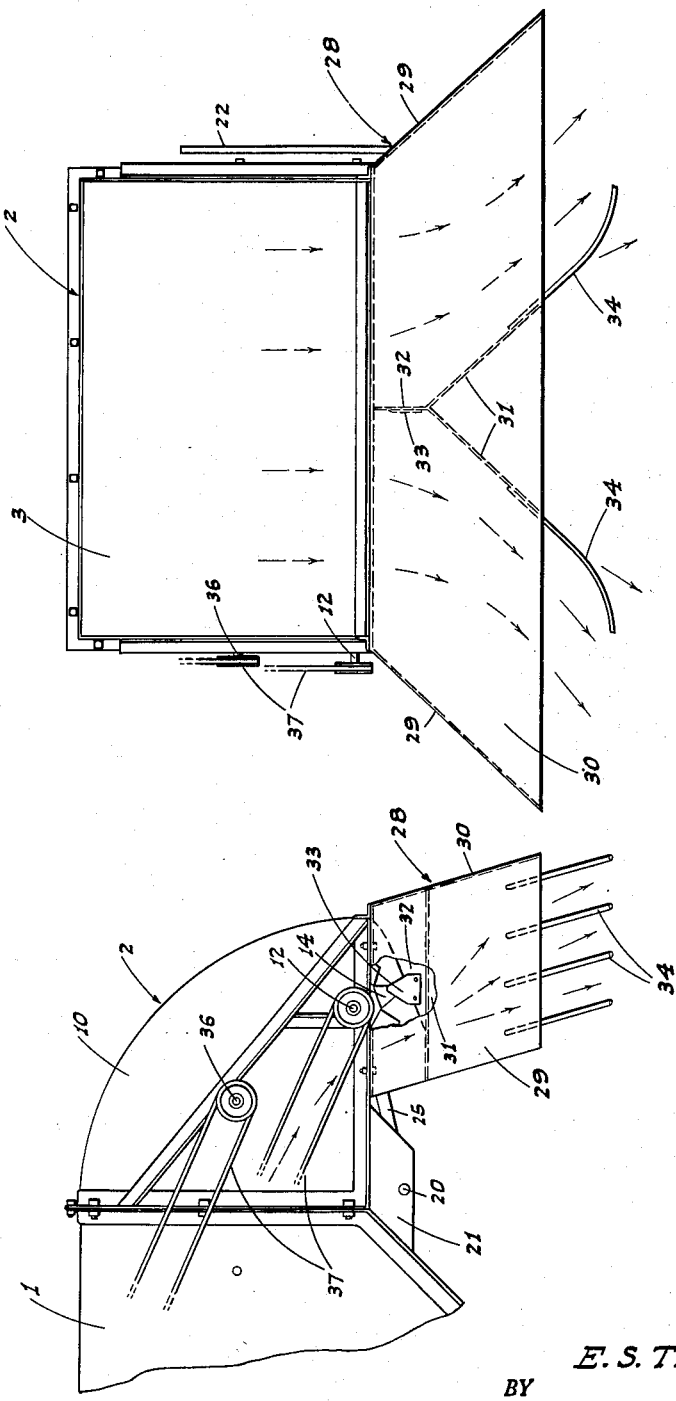
INVENTOR.
E. S. Thompson
BY
ATTYS Patented Jan. 20, 1953

2,626,159

UNITED STATES PATENT OFFICE 2,626,159

STRAW CHOPPER AND SPREADER FOR HARVESTERS

Ernest S. Thompson, Strathmore, Calif., assignor to himself and Ethel Thompson, as joint tenants Application April 1, 1949, Serial No. 84,843

5 Claims. (Cl. 275—3)

1

This invention is directed to, and it is an object to provide, a novel, straw chopper and spreader for grain harvesters, such as combines or threshers.

Another object of the invention is to provide a straw chopper and spreader which is operative to chop the long straw into small pieces, and to scatter or broadcast such pieces over the ground for subsequent working thereinto, for mulch or humus, by a tillage implement. By comminuting the long straw and then broadcasting it, as above, subsequent tillage is not hindered, and the straw as worked into the ground by such tillage has a much more beneficial effect due to better admixture and more rapid disintegration.

A further object of the invention is to provide a straw chopper and spreader which comprises a novel structural arrangement for feeding, chopping, and spreading the straw as discharged from the primary mechanism of the harvester; the invention being designed for attachment as an accessory to an existing harvester, or so that it may be incorporated at the time of manufacture of the harvester.

An additional object of the invention is to provide a straw chopper and spreader for harvesters which includes a novel rotary chopper and concave assembly for chopping the long straw into small pieces; the concave being mounted in a manner which permits of its movement away from the rotary chopper in the event of a jam or clogging of straw in the assembly.

It is also an object of the invention to provide a straw chopper and spreader which is designed for ease of economy of manufacture, and for long life with a minimum of servicing or repair.

A further object of the invention is to provide a practical and efficient straw chopper and spreader for harvesters, and one which will be exceedingly effective for the purpose for which it is designed.

These objects are accomplished by means of such structure and relative arrangement of parts as will fully appear by a perusal of the following specification and claims.

In the drawings:

Fig. 1 is an elevation, mainly in section, showing the straw feeding and chopping mechanism.

Fig. 2 is a rear end view of said mechanism; the shroud being partially broken away.

Fig. 3 is a side elevation of the straw chopper and spreader, as in use, and including the discharge hood and deflector.

Fig. 4 is a rear end view of the assembly.

2

Referring now more particularly to the characters of reference on the drawings, the straw chopper and spreader is adapted to be mounted in connection with a harvester which includes a rearwardly projecting housing 1 open at its rear end in communication with a shroud 2 which includes a curved back wall 3 whose purpose is to deflect material from the shroud and out of its open end 4.

The long straw from the harvester is normally fed, by a driven, endless straw belt 5, into the shroud 2, whence said straw is carried by the air blast out of the open end 4 of said shroud onto the ground as a windrow. The subsequent handling of long straw in a windrow, as above, is difficult, particularly if the long straw becomes wet. In order to facilitate tillage of the straw into the ground, it is desirable that such straw be chopped into small pieces and then spread or broadcast over the ground from the harvester. To this end the present invention provides the following straw chopping and spreading mechanism:

Directly to the rear of the straw belt 5, the shroud 2 is fitted with a substantially full width, rearwardly extending table 6, which normally inclines slightly from its forward end. The table 6 merges, at its rear end, with a dependent, rearwardly facing concave 7; the table 6 and concave 7 being integral, and reinforced—at opposite sides—on the underneath, by strengthening ribs 8.

The table 6 is pivoted, as at 9, to the adjacent sides 10 of the shroud 2 for adjustment between its normal raised or working position to a normally lowered, non-working position, as shown in full lines and broken lines, respectively, in Fig. 1. In the lowered non-working position of the table 6, the concave 7 is not only lowered but advanced, for the reason hereinafter described.

In cooperative relation to the concave 7, but rearwardly thereof, the device includes a transverse axis, rotary chopper, indicated generally at 11; such rotary chopper comprising the following structural arrangement:

A cross shaft 12 is journaled between the sides 10 of the shroud, and at spaced points therealong such shaft is fitted with generally triangular, radial mounting plates 13 initially turnable on said shaft. At the corners thereof, the mounting plates 13 are fitted with outwardly projecting, sickle-type, double-edged blades 14 whose cutting edges are generally in inverted V-relation. Cylindrical spacers 15 are disposed on the shaft 12 between the mounting plates 13, and the entire assembly is tightened longitudinally on the cross shaft 12 by means including a nut 16 at one end thereof. The mounting plates 13 are thus secured frictionally in connection with the shaft 12, but should any one of the blades 14 strike an obstruction, the corresponding plate 13 may slip between the ends of the adjacent cylindrical spacers 15, to the end that blade and mounting plate breakage is minimized.

The mounting plates 13 are disposed in staggered relation so that the blades 14 of the different plates work, with respect to the concave 7, in out-of-time order.

The concave 7 includes, on its face, an upper and lower row of rearwardly projecting cutter bars 17 disposed so that corresponding blades 14 pass by the same in close working or cutting relation; the cutter bars 17 being affixed to the concave 7 by attachment plates 18 secured by bolts 19.

The table 6, and integral concave 7, are releasably maintained in their normal working position, as follows:

Below the table 6 and ahead of the concave 7, the device includes a cross shaft 20 which extends between depending gussets 21, and beyond one of said gussets the shaft 20 includes a hand lever 22.

Between the gussets 21, a sleeve 20a is mounted on cross shaft 20, being secured on said shaft by a removable cross bolt or pin B. A pair of transversely spaced, rearwardly projecting radial arms 23 are fixed on sleeve 20a, which arms pivot at their rear ends, as at 24, to the forward ends of corresponding, rearwardly projecting links 25; the latter pivoting, as at 26, to the rear of the concave 7.

The cross shaft 20 is normally disposed so that the radial arms 23 and links 25 are broken upwardly beyond dead-center a slight distance, and lock against further motion in such direction by reason of a stop 27 on the lower edge of each link 25 projecting toward, and bearing against, the lower edge of the corresponding arm 23. Thus, as long as these parts are above dead-center, the table 6 and concave 7 are maintained in their normal working position and cannot swing downwardly. The reason for this breakdown arm and link arrangement will hereinafter appear.

Below the assembly of concave 7 and rotary chopper 11, the shroud 2 is fitted with a dependent discharge hood 28; such hood including flaring side walls 29, and parallel but rearwardly and downwardly inclined front and rear walls 30.

Centrally between the flaring side walls 29 thereof, the discharge hood 28 is fitted, internally, with an inverted V-divider 31 which extends between the front and rear walls 30; the apex of such divider being some distance below the rotary chopper 11.

At said apex the inverted V-divider 31 is fitted, within the discharge hood 28, with an upstanding, longitudinal fin 32 which progressively increases in height toward its rear end. Intermediate its ends such fin 32 carries an upstanding cutter blade 33 positioned to cooperate with the blades 14 on the corresponding mounting plate 13.

On opposite sides, and at its lower edges, the inverted V-divider 31 is fitted with a plurality of outwardly and downwardly inclined, spreader or deflector fingers 34 having a slight upward curvature at their lower portions.

In operation of the above described straw chopper and spreader, the long straw from the harvester is discharged from the straw belt 5 onto the table 6, whence it is fed from such table by a non-wrapping, transverse axis, rotary beater and straw feeder mounted in the shroud 2 by means of a cross shaft 36.

The long straw as fed from the table 6 by the rotary feeder 35 delivers between the concave 7 and rotary chopper 11, and with rotation of the latter in the direction indicated, such long straw is effectively chopped by the blades 14 working in cooperation with the cutter bars 17 of the concave 7. The straw as thus finely chopped delivers from the open end 4 of the shroud 2 into the discharge hood 28, being carried in its path of travel by the air blast from the harvester housing 1, which blast is directed by the shroud 2 through the hood 28.

The finely chopped straw passes down through the hood 28 in two streams separated by the inverted V-divider 31. These streams are broken up by the spreader or deflector fingers 34, so that the finely chopped straw spreads or broadcasts over a relatively wide area, mainly to opposite sides of the harvester and without tendency to windrow.

As thus broadcast upon the ground, the finely chopped straw does not impede ready tillage, and when worked into the ground provides more effective humus or mulch than otherwise.

The cross shafts 12 and 36 of the rotary chopper 11, and rotary feeder 35, respectively, are driven, in the directions indicated, and at different selected speeds, from any suitable driven shaft on the harvester, by means of endless belt and pulley units, indicated generally at 37.

The upstanding cutter blade 33 on the longitudinal fin 32 is provided for the purpose of preventing any long straw from piling up or tending to jam between the rotary chopper 11 and the fin 32 on the apex of the inverted V-divider 31. Any long straw which reaches the cutter blade 33 is immediately severed, so that it cannot remain engaged across the fin 32.

Under certain working conditions, as upon excessive straw flow into the shroud 2, a jam may occur between the rotary feeder 35, the rotary chopper 11, and the assembly of table 6 and concave 7. When this occurs the rotary chopper 11 is ineffective, and it is necessary that the clogging or jamming be freed. To accomplish this, the hand lever 22 is thrown in a direction to break down the arm and link arrangement between the cross shaft 20 and concave 7. When this is done the arms 23 and links 25 break below dead center and swing from their full line position of Fig. 1 to their broken line position of said figure; the table 6 and concave 7 then both swinging downwardly and rearwardly. This permits the clog or jam of straw to be manually worked out of the shroud 2 between the concave 7 and rotary chopper 11.

In case of trouble, or when the straw is not to be chopped, bolt B is removed, to allow withdrawal of shaft 20. The bolts 9 are also removed, and the entire concave and its supporting assembly are removed from shroud 2, so that the straw will fall directly onto the ground from belt 5 without interference.

It should be noted that various types of cutter bars 17 may be used to cut different kinds of straw and to suit different conditions. Since these bars are removably bolted on table 6, they may be quickly changed when necessary.

The described straw chopper and spreader for harvesters thus provides a practical and reliable device for the intended purpose, and the construction of the mechanism is that it requires a minimum of maintenance or repair.

From the foregoing description it will be readily seen that there has been produced such a device as substantially fulfills the objects of the invention, as set forth herein.

While this specification sets forth in detail the present and preferred construction of the device, still in practice such deviations from such detail may be resorted to as do not form a departure from the spirit of the invention, as defined by the appended claims.

Having thus described the invention, the following is claimed as new and useful, and upon which Letters Patent are desired:

1. A straw chopper for a traveling harvester including a downwardly opening straw discharge shroud projecting outwardly beyond the rear end of the harvester, a table mounted in the shroud in straw receiving relation, a rearwardly facing concave at the rear end of and below the table, a driven, transverse axis rotary chopper mounted in the shroud adjacent the opening and rearward of and in cooperative relation to the concave, means to feed straw from the table to a point between the chopper and concave, the table and concave being a unit, means pivotally mounting the unit at its upper forward end for forward and downward swinging motion from a normal working position with the table raised and the concave adjacent said rotary cutter, and means normally but releasably securing the unitary table and concave in said working position.

2. A structure as in claim 1, in which said releasable securing means includes a cross shaft ahead of the concave below the table, an actuating lever on one end of the shaft, and a normally above dead-center, break-down arm and link unit between the cross shaft and concave.

3. In a traveling harvester having straw chopping means enclosed within a rear-end downwardly opening shroud, and a discharge hood depending from the shroud in communication with the opening thereof; straw deflecting means mounted in the hood; said deflecting means including an inverted V-shaped divider mounted in the hood with the sides of said divider inclining transversely of the direction of travel and outwardly below the opening.

4. In a traveling harvester having straw chopping means enclosed within a rear-end downwardly opening shroud, and a discharge hood depending from the shroud in communication with the opening thereof; straw deflecting means mounted in the hood; said deflecting means including an inverted V-shaped divider mounted in the hood with the sides of said divider inclining transversely of the direction of travel and outwardly beyond the sides of the shroud; there being a longitudinal, upstanding fin on the divider at the apex, and a blade upstanding from said fin in cooperative relation to the rotary cutter.

5. In a traveling harvester having straw chopping means enclosed within a rear-end downwardly opening shroud, and a discharge hood depending from the shroud in communication with the opening thereof; straw deflecting means mounted in the hood; said deflecting means including an inverted V-shaped divider mounted in the hood with the sides of said divider inclining transversely of the direction of travel and outwardly beyond the sides of the shroud, and a plurality of downwardly and outwardly inclined deflector fingers projecting, in spaced relation, from the lower edges of the sides of the divider.

ERNEST S. THOMPSON.

REFERENCES CITED

The following references are of record in the file of this patent:

UNITED STATES PATENTS

| Number | Name | Date |
|---|---|---|
| 520,725 | Broatch | May 29, 1894 |
| 813,957 | Eisenhart | Feb. 27, 1906 |
| 930,166 | Eisenhart | Aug. 3, 1909 |
| 1,024,413 | Miks | Apr. 23, 1912 |
| 1,275,332 | Wallace | Aug. 13, 1918 |
| 1,600,014 | Purrmann | Sept. 14, 1926 |
| 1,628,871 | Bruce | May 17, 1927 |
| 1,840,749 | Stresau | Jan. 12, 1932 |
| 1,914,839 | Thoen | June 20, 1933 |
| 1,968,417 | Morine | July 31, 1934 |
| 2,172,886 | Gabel | Sept. 12, 1939 |
| 2,280,677 | Wagner et al. | Apr. 21, 1942 |
| 2,281,212 | Stoltzfus | Apr. 28, 1942 |
| 2,281,846 | Klein | May 5, 1942 |
| 2,397,363 | McLeod | Mar. 26, 1946 |
| 2,402,007 | Anderson | June 11, 1946 |
| 2,502,032 | Watson | Mar. 28, 1950 |

FOREIGN PATENTS

| Number | Country | Date |
|---|---|---|
| 254,689 | Italy | Dec. 7, 1926 |
| 455,291 | Germany | Jan. 28, 1928 |
| 462,128 | Great Britain | Mar. 2, 1937 |